US008952785B2

(12) United States Patent
Dijkstra et al.

(10) Patent No.: US 8,952,785 B2
(45) Date of Patent: Feb. 10, 2015

(54) REDUCTION OF IMU/AP LINK REQUIREMENTS FOR SDI

(75) Inventors: Freerk Dijkstra, Hengelo (NL); Hendrik Johannes Luinge, Enschede (NL); Giovanni Bellusci, Enschede (NL); Per Johan Slycke, Schalkhaar (NL)

(73) Assignee: Xsens Holding B.V., Enschede (NL)

( * ) Notice: Subject to any disclaimer, the term of this patent is extended or adjusted under 35 U.S.C. 154(b) by 77 days.

(21) Appl. No.: 13/431,570

(22) Filed: Mar. 27, 2012

(65) Prior Publication Data

US 2012/0226468 A1    Sep. 6, 2012

Related U.S. Application Data

(63) Continuation-in-part of application No. 12/940,420, filed on Nov. 5, 2010.

(30) Foreign Application Priority Data

Nov. 6, 2009  (EP) .................................... 09175290

(51) Int. Cl.
*G08B 5/22*    (2006.01)
*H04Q 9/00*   (2006.01)

(52) U.S. Cl.
CPC ............ *H04Q 9/00* (2013.01); *H04Q 2209/84* (2013.01); *H04Q 2209/823* (2013.01); *H04Q 2209/88* (2013.01)
USPC .......................................... 340/8.1; 702/141

(58) Field of Classification Search
CPC ..................................................... G08B 21/023
USPC .......... 701/4, 24, 141, 200, 201, 220; 73/503, 73/503.3; 702/141; 340/539.3, 539.26, 340/870.01–870.06
See application file for complete search history.

(56) References Cited

U.S. PATENT DOCUMENTS

2004/0064252 A1*   4/2004  Kirkland et al. ............. 701/220
2005/0264429 A1*  12/2005  Hermary et al. ......... 340/870.06
(Continued)

FOREIGN PATENT DOCUMENTS

WO    WO-2006/041891    4/2006
WO    WO-2008/088145    7/2008

OTHER PUBLICATIONS

Search report from related European Application No. EP 09175290.7; report dated Dec. 29, 2009; 8 pages.
(Continued)

*Primary Examiner* — Hai Phan
*Assistant Examiner* — Zhen Y Wu
(74) *Attorney, Agent, or Firm* — Miller, Matthias & Hull LLP

(57) ABSTRACT

A method, controller and system in accordance with various aspects of the present disclosure facilitate reduced energy consumption in a motion sensing device having an inertial measurement unit (IMU), with a strap down integration unit, and an application processing unit (AP). The system and method include sensing acceleration values and rotational values at the IMU and converting the sensed acceleration and rotational values into velocity and orientation increments by strap down integration. The velocity and orientation increments are stored in a first buffer at the IMU between updates to the AP. When an update request is received at the IMU from the AP over an interrupt link, the buffer contents are transmitted over a serial link from the IMU to the AP.

14 Claims, 8 Drawing Sheets

(56) References Cited

U.S. PATENT DOCUMENTS

| | | | |
|---|---|---|---|
| 2006/0069469 A1* | 3/2006 | Campbell et al. | 701/4 |
| 2008/0004796 A1* | 1/2008 | Schott et al. | 701/201 |
| 2009/0058679 A1* | 3/2009 | Lauterbach et al. | 340/905 |
| 2009/0192751 A1 | 7/2009 | Kamath et al. | |
| 2010/0299003 A1* | 11/2010 | Hanson et al. | 701/4 |

OTHER PUBLICATIONS

Swiss Transport Research Conference; "Calculation of Displacements of Measured Accelerations, Analysis of Two Accelerometers and Application in road Engineering"; Martin Arraigada, Empa, Road Engineering/Sealing Comp.; Manfred Partl, Empa Road Engineering/Sealing Comp.; Conference Paper STRC 2006.

"Attitude Estimation by Compensating Gravity Direction" Lekskulchai Pongsak, et al. Department of Mechano-Informatics, The University of Tokyo 7-3-1 Hongo Bunkyo-ku, Tokyo 113-8656 Japan Nomura Research Institute CREST Program, Japan Science and Technology Corporation.

European search Report issued on Sep. 8, 2013 for Corresponding Application No. 13161077.6.

\* cited by examiner

REDUCTION OF IMU/AP LINK REQUIREMENTS FOR SDI

RELATED APPLICATION

This application is a continuation in part of U.S. application Ser. No. 12/940,420 filed on Nov. 5, 2010, and entitled "Method and a System for Enabling a Wireless Communication Between a Master Unit and a Sensor Unit," which claims priority to European Patent Application 09175290.7 filed Nov. 6, 2009, the entirety of both applications being herein incorporated by reference for all that they teach without exclusion of any part.

TECHNICAL FIELD OF THE DISCLOSURE

The present disclosure relates to communications between an inertial measurement unit (IMU) and an application processor (AP) and, more particularly, relates to reduction of required bandwidth of a link between the IMU and AP.

BACKGROUND OF THE DISCLOSURE

The accurate recording or analysis of any movement requires, first and foremost, that the movement be accurately sensed. This was the basis for early navigational tools such as the magnetic compass and the astrolabe, and it remains true today. Moreover, while tools such as the compass and astrolabe require external sources of reference to determine motion, it is sometimes necessary to determine motion internally, i.e., via inertial measurements alone.

Early inertial measurement systems required that the sensing elements be isolated from the surrounding environment via complex and troublesome gimbaled or fluid-suspended gyro-stabilized platforms. However, advances in electronics and micro devices have facilitated a variety of inertial sensor system known as a strap-down system (sometimes referred to as a Strap-Down Integration system or Strap-Down Inertial system, both abbreviated "SDI").

A typical SDI system contains two primary components, namely an inertial measurement unit (IMU) and an application processor (AP). A typical architecture 100 based on these components is shown in FIG. 1. The illustrated system 100 contains the IMU 102 and the AP 104 with a number of sub-elements within the IMU 102. These include an analog section 106 having a number of gyroscopic sensors 108 and acceleration sensors 110 (accelerometers) providing input to an analog-to-digital converter 112 (ADC). The ADC 112 periodically samples the sensors 108, 110 and digitizes their values for calibration adjustment through a calibration module 114. Calibration may be based on environmental factors, such as a temperature value from temperature sensor 115, or otherwise. Finally, within the IMU 102, the digitized and calibrated values are provided to the SDI unit 116 for integration.

In order to prevent aliasing, coning and sculling, which may be caused by vibration or shocks, the sampling frequency at the analog side of the ADC 112 must typically be high. Thus, in most state-of-the-art IMUs, the analog sensing elements are sampled at a rate of a few kHz, e.g., 2-4 kHz, with multiple samples being used to create each frame at a frame rate of 200-400 Hz. In particular, the SDI unit 116 may combine a number of samples to determine the increment in the angle and velocity ($\Delta q$ and $\Delta v$ respectively). The processed values are then transmitted over a link 118 to the AP 104.

However, transmitting this data to the AP 104 via the link 118 requires the link 118 to have a very high bandwidth. Moreover, the actual update rate required by an application using the data may be lower. For example, a frame update rate of 24 Hz may be sufficient if the output is streamed to screen and a frame update rate as low as 1 Hz may be sufficient for pedestrian navigation guidance applications.

Where the sample rate is implemented in hardware, the SDI rate is defined by the number of integrated samples and the update rate by the number of SDI frames. In most devices, the SDI rate is the same as the update rate. On professional grade IMUs there are typically no buffers implemented since the AP using such devices should always have the time or be configured to handle the data and/or buffers are implemented sufficiently on the receive side, e.g. by implementing the communication using direct memory access (DMA) in which data points are stored in memory without involving the AP.

For consumer grade mobile devices, power consumption is a significant concern, and so power management is typically achieved by lowering the update rate of the IMU and switching the processor to a low-power or sleep-mode, to occasionally 'wake-up' and handle data from the sensors. As such digital IMUs integrated in mobile devices often use an on-board FIFO memory structure to store their data and have it ready for the processor to fetch it in a single burst.

However, the described current state-of-the-art architecture for mobile devices using consumer grade IMUs exhibits two substantial problems, namely excessively low update rate and buffer overflow. With respect to the update rate, to preserve power, typically the update rate at the mobile device will be as low as possible. This also might be implemented in hardware by limiting the bandwidth (i.e. lowering the clock) of the communication line, thereby effectively making it impossible to send data at higher update rates. With respect to buffer overflow when strap down integration is implemented, the buffer of the IMU may overflow when the AP is too busy to read out the buffer or when the bus is too full with other communication.

The present disclosure is directed to a system and method for addressing some or all of the above difficulties; however, it should be appreciated that the solution of any particular problem is not a limitation on the scope of this disclosure or of the attached claims, except to the extent expressly noted. Additionally, this background section discusses problems and solutions noted by the inventors; the inclusion of any problem or solution in this section is not an indication that the problem or solution represents known prior art except as otherwise expressly noted. With respect to prior art that is expressly noted as such, the summary thereof is not intended to alter or supplement the prior art document itself; any discrepancy or difference should be resolved by reference to the prior art.

SUMMARY OF THE DISCLOSURE

In accordance with one aspect of the present disclosure, a system and method are provided for reducing energy usage in a motion sensing device having an inertial measurement unit, with a strap down integration unit, and an application processing unit. The method includes sensing acceleration values and rotational values at the inertial measurement unit and converting the sensed acceleration and rotational values into velocity and orientation increments by strap down integration. The velocity and orientation increments are stored in a first buffer at the inertial measurement unit between updates to the AP. When an update request is received at the IMU from the AP over an interrupt link, the buffer contents are transmitted over a serial link from the inertial measurement unit to the application processing unit.

In an embodiment of the invention, the first buffer is a first in first out buffer. While the update request from the application processing may be an interrupt signal in an embodiment of the invention, it is a clear to send signal or the like in another embodiment. To assist in capturing high frequency data between updates, the IMU implements event detection in an embodiment of the invention and stores high-frequency event data in a backtrack buffer at the IMU. The IMU notifies the AP when a high-frequency event has occurred and the AP may request detailed data for the interval of interest. In this situation, the IMU sends the contents of the backtrack buffer to the AP for analysis.

In an embodiment of the invention, in order to avoid buffer overflow in the first buffer, the IMU may combine the two oldest values in the first buffer via SDI so as to maintain the overall motion represented by the combined data.

Additional and alternative features and aspects of the disclosed methods and systems will become apparent from reading the detailed specification in conjunction with the included drawing figures.

DETAILED DESCRIPTION OF THE DISCLOSURE

The present disclosure provides an architecture that enables a device to minimize power consumption by reducing the number of data points that are communicated across a serial connection between an AP and an IMU. In overview, and in accordance with certain embodiments of the invention, this is accomplished by equipping the IMU with a FIFO buffer. Instead of the FIFO containing angular velocities and accelerometer values, it contains velocity and orientation increments obtained by strap down integration. Further, as a result, in the case of imminent buffer overflow, two velocity increments and orientation increments are combined using a further strap down integration step. Thus, although the specific orientation and velocity for a specific moment is lost, the resulting integrated orientation and velocity increment is maintained, albeit over a longer interval.

In an embodiment of the invention, the FIFO minimally contains the last velocity increment and orientation increment (i.e., an on-demand configuration). In a further embodiment of the invention, a user can opt to configure the IMU such that the last velocity and orientation increment is sent only on request of the AP, thereby reducing the information stream to what is absolutely necessary for the application. Each time the IMU is sampled, a small orientation/velocity increment is added to the existing orientation/velocity increment. After the buffer has been readout at the request of the AP, the SDI-values (velocity and orientation increments) are reset to zero.

Figure 1:
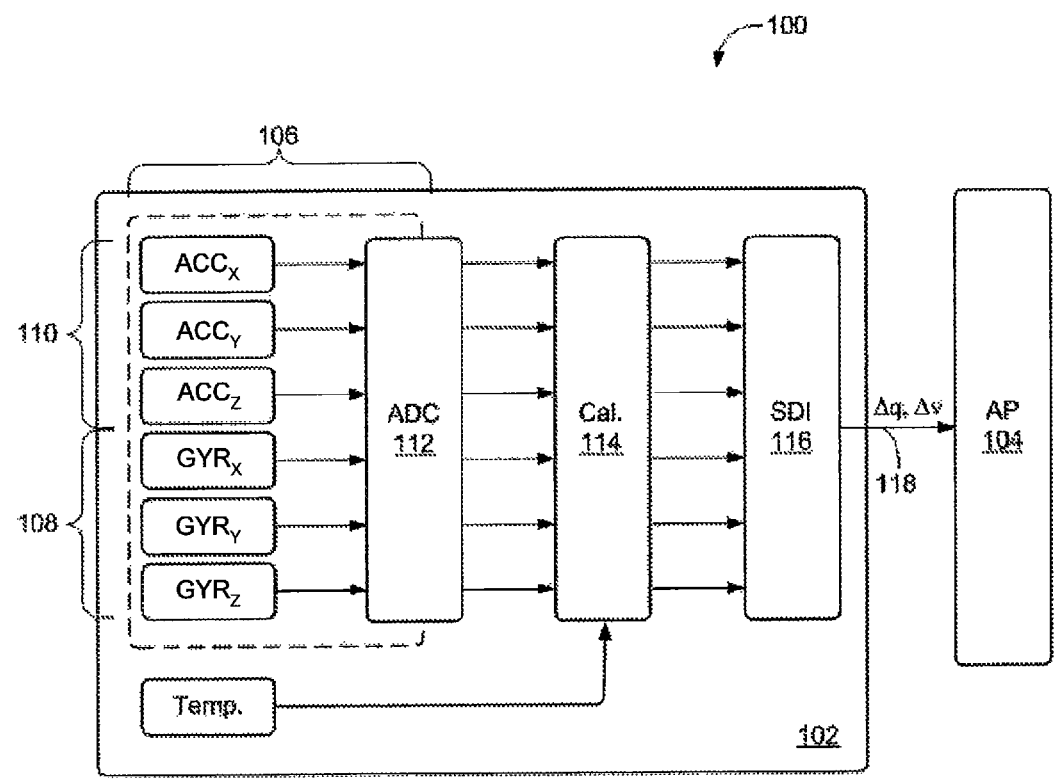
FIG. 1 is a schematic diagram of an ordinary SDI configuration.
Figure 2:
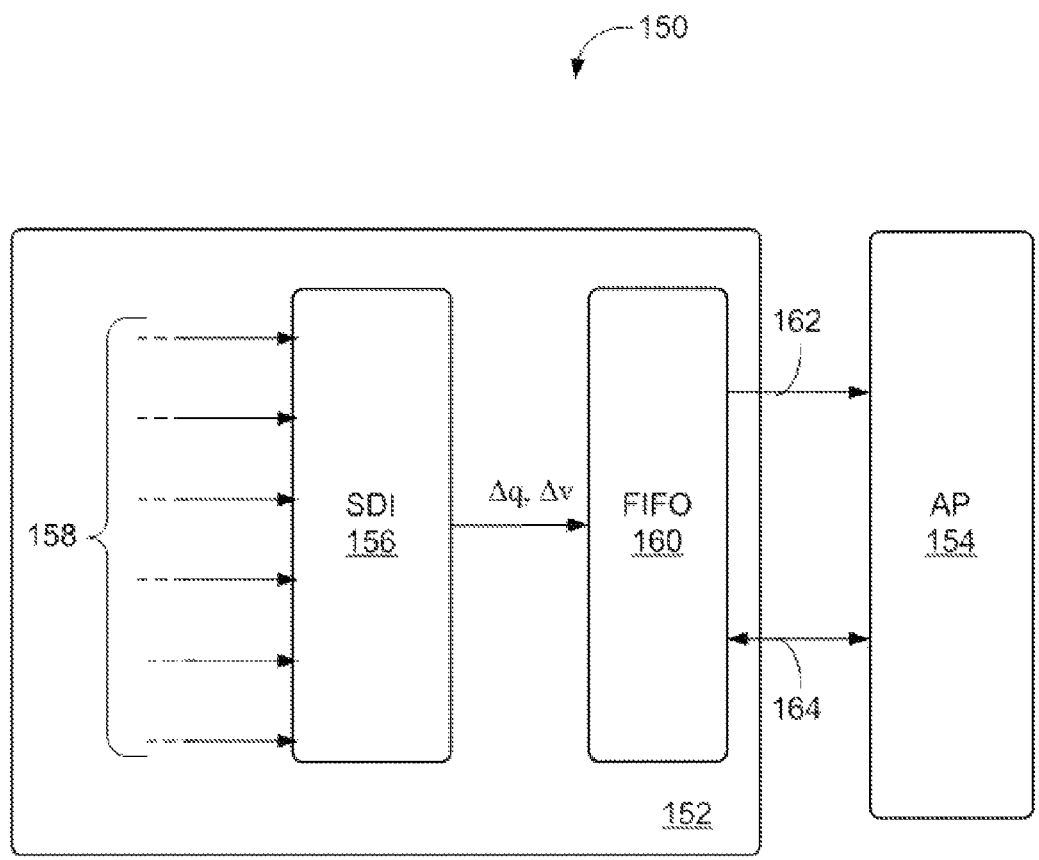
FIG. 2 is an exemplary architecture in keeping with the present disclosure including an IMU having a FIFO buffer, as well as an AP.

With above overview in mind, and turning now to FIG. 2, there is shown an exemplary architecture 150 in keeping with the present disclosure. The illustrated architecture 150 includes an IMU 152 and an AP 154. The IMU 152 in turn comprises an SDI unit 156 for receiving calibrated sensor data on inputs 158, e.g., from a calibration unit in communication with a plurality of accelerometers and gyroscopic sensors in a traditional manner.

The IMU 152 further includes a first in first out (FIFO) buffer 160. The FIFO buffer 160 receives velocity and orientation increments obtained by strap down integration from the SDI unit 156. The FIFO buffer 160 is in turn configured to serially transmit its contents to the AP 154 over serial link 162 (e.g. SPI, I2C). In particular, a bidirectional interrupt line 164 from the AP 154 to the FIFO buffer 160 is used to trigger transmission from the FIFO buffer 160 to the AP 154. The interrupt line 164 may be used to transmit an actual interrupt signal or may transmit a "clear to transmit" signal or the like. The technical implementation of a bi-directional interrupt line will be within the abilities of those of ordinary skill in the art, and can be done in any suitable manner.

As noted above, in the event of an imminent buffer overflow of the FIFO buffer 160, the oldest two velocity increments and orientation increments are combined via strap down integration in an embodiment of the invention. As a result, although one or more samples from specific moments are discarded, the resulting integrated orientation and velocity increment is maintained, albeit over a longer interval.

In a further embodiment of the invention, the FIFO buffer 160 contains at least the latest velocity increment and orientation increment (e.g., for an on-demand configuration). In this embodiment, a user can choose to configure the IMU 152 such that this latest velocity and orientation increment is sent only on request of the AP 154, thereby reducing the information stream over serial link 162 to what is absolutely necessary for the application running at the AP 154.

Each time the IMU 152 is sampled, a small orientation/velocity increment is added to the existing orientation/velocity increment. After the FIFO buffer 160 has been readout upon request of the AP 154, the SDI values (velocity and orientation increments) are reset to zero. This on-demand embodiment of the invention will be discussed in greater detail below.

Within the on-demand embodiment, there is no requirement to pre-configure an update rate at which data will be transmitted from the FIFO buffer 160 to the AP 154. Rather, the AP 154 determines when to request an SDI data-point from the FIFO buffer 160 without losing accuracy. In this embodiment further, a backtrack buffer may be implemented through which the overflow can be handled effectively without losing data.

The AP 154 is then able to request the SDI data at irregular intervals, e.g. when an update is required given the processor load, the application currently running and the real-time requirements. Issuing the request is implemented via the interrupt line 164 by the AP 154 sending an interrupt signal or other similar signal (e.g. a 'clear-to-send' indication). When the AP 154 asserts this line 164, the IMU 152 will transmit the SDI value at the end of the next frame, i.e. at the next integration step. This means that the IMU 152 will not react directly on the assertion of the interrupt line by the AP 154 since that could interfere with the precise sample timing at the IMU 152. Instead, the IMU 152 will check the level of the interrupt line at the frame transition. If the level of the interrupt line at the frame transition is high, the IMU 152 will transmit the calculated SDI value.

When not transmitting its SDI data, the IMU 152 continues to integrate thereby effectively increases the interval until the AP 154 requests the data. The transmitted value corresponds to the interval between the current time and the last time at which the AP 154 requested the SDI data.

In an embodiment of the invention, after assertion of the interrupt line 164 and once the IMU 152 has transmitted the SDI data to the AP 154, the IMU 152 pulls down (de-asserts) the interrupt line 164 at the frame transition. The reason for the IMU 152 to de-assert the interrupt line 164 specifically at the frame transition is to allow the AP 154 to capture this moment precisely in the AP's own timeframe. This can then be used, as mentioned below, to correlate the IMU with other data.

In addition, since the AP has information indicating the frame rate at the IMU 152 and how many frames are associated with the interval, other corrections could be implemented as well to cope with clock-errors, e.g., caused by a poor clock at the IMU 152. This eases the requirements for the clock at the IMU 152 and thereby reduces power consumption. The power savings occurs because precise clocks must be temperature compensated, which consumes power. While shared clocks could be used instead, this introduces additional complexity and costs. Regardless, the time corrections on the IMU data at the AP 154 should not counteract the calibrations done on the IMU itself.

It will be appreciated that the timing data is not available when the AP 154 keeps the interrupt line 164 high to have the IMU 152 transmit at the highest effective update rate as discussed above. However, the lack of timing information in this case will not create a problem as long as the clocks of the IMU 152 and AP 154 are correlated enough for the AP 154 to be able to determine the current frame at the IMU 152 given its own internal time. Similarly, the AP 154 need not capture the timestamp for each and every data-point received, since clock correlation algorithms can determine the timestamp of the received data-point.

Figure 3A:
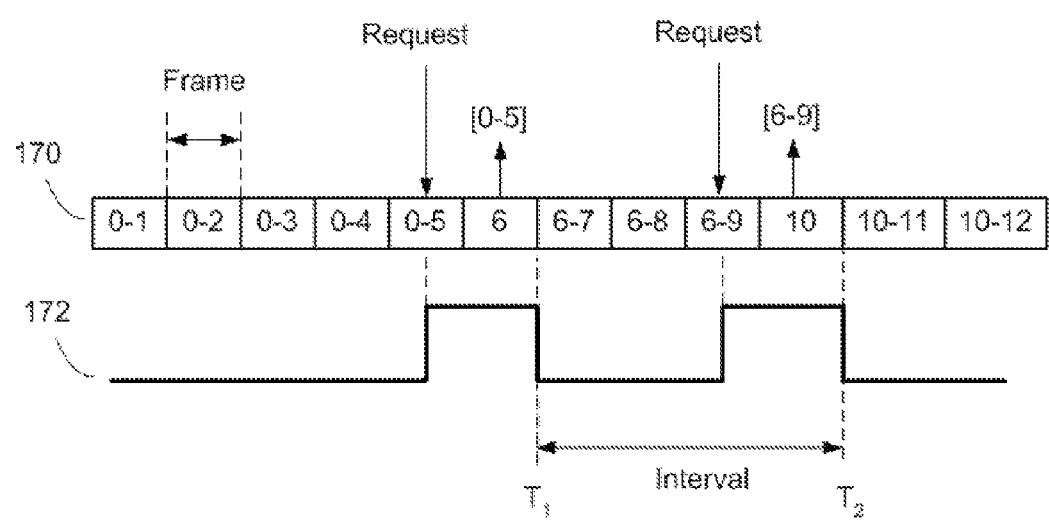
FIG. 3A is a schematic frame sequence diagram correlating the timing of assertion and de-assertion of the interrupt line with the SDI frame transmission and creation.

Continuing, an example of SDI data request timing is illustrated in the example of FIG. 3A. In particular, FIG. 3A is a schematic frame sequence diagram correlating the timing of assertion and de-assertion of the interrupt line 164 with the SDI frame transmission and creation.

From a starting point in time, the SDI unit generates sequential frames 170 incorporating data from sequential sample instances. Thus, the sequence of frames 170 begins with a frame containing the first two sample instances, and has become a frame incorporating the first six sample instances as of the time when the interrupt signal 172 is asserted. While the interrupt signal 172 is asserted, the SDI transmits a frame incorporating samples 0 through 5 and begins creation of frames [6-*n*]. At the start of the creation of the frame incorporating samples 6-7, the IMU 152 de-asserts the interrupt line at time $T_1$.

The interrupt signal 172 is again asserted by the AP 154 during creation of the [6-9] frame, after which the IMU 152 transmits the [6-9] frame and begins creation of frames [10-*n*]. At the start of the creation of the frame incorporating samples 10-11, the IMU 152 de-asserts the interrupt line at time $T_2$. Thus, while the update interval required by the AP 154 is $T_1$-$T_2$, the update rate of the IMU 152 is much quicker.

Regarding synchronization, the timestamp can be obtained in the ISR of the AP 154 and the SDI data can be read, for example, from its DMA channel. Using the timestamps, the AP 154 can correlate the SDI data with other sensor data in its own timeframe since the exact time of capture is known.

The transmission of the IMU 152 should be completed before the AP 154 issues a new request by re-asserting the interrupt line 164. This can be assured via appropriate hardware or software, i.e., to ensure that the interrupt line 164 cannot be asserted during an ongoing transmission.

As noted elsewhere herein, the AP 154 can keep the interrupt line 164 high and as a result the IMU 152 continues to send data. However, if the serial communication line 162 has too low of a data rate, such that a new value becomes available during the transmission of a current value, upcoming values will be buffered in the FIFO until the buffer is filled, at which point the mechanism of combining two elements is used as described elsewhere herein. This demonstrates the manner in which the described mechanism can be used to provide great freedom in choosing the data rate of the serial line, even during operation.

Figure 3B:
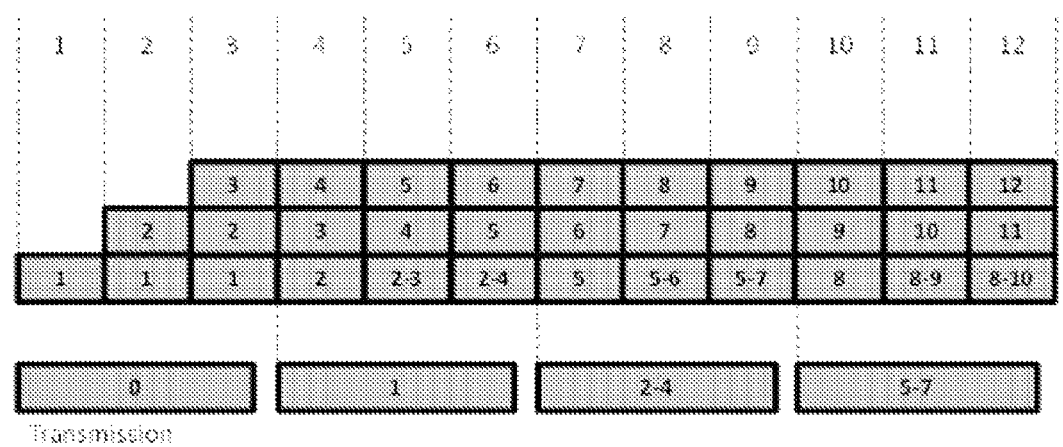
FIG. 3B is a schematic frame sequence diagram showing the contents of the FIFO buffer and the ongoing transmission for a number of consecutive frames.

Consider a situation in which the AP 154 keeps the interrupt line 164 high and consequently the IMU 152 is continually transmitting the oldest element in the FIFO. Further, in this example, the FIFO can contain 3 elements and the transmission of a single value takes approximately 3 frames. This means that after 3 frames there is room for a new element. In FIG. 3b, the contents of the FIFO buffer and the ongoing transmission are illustrated for a number of consecutive frames. As can be seen from FIG. 3b, due to the combining of the two oldest elements when the buffer is full, the system automatically adjusts itself to the capabilities of the serial communication link in use by effectively lowering the rate at which the data is received. This benefit is achieved without requiring any additional hardware or logic whatsoever.

It will be appreciated that since the IMU 152 may be aware of an occasional high frequency event, i.e., an event that exhibits significant changes in sensed data at a rate much higher than the AP update rate, high frequency events may go unnoticed by the AP 154 in an on-demand update system unless precautions are taken. In this connection, in an embodiment of the invention, a prediction technique is applied at the AP 154 to decrease the update request interval when a high frequency event is anticipated.

Thus, for example, the AP 154 may keep the interrupt line 164 high through the anticipated event. As a result, the IMU 152 would continue sending the data, which is then stored in DMA. An example of a predictable event with respect to which this technique would apply is the periodic swaying of a skater. However, for unpredictable events, prediction is not as effective.

Figure 4:
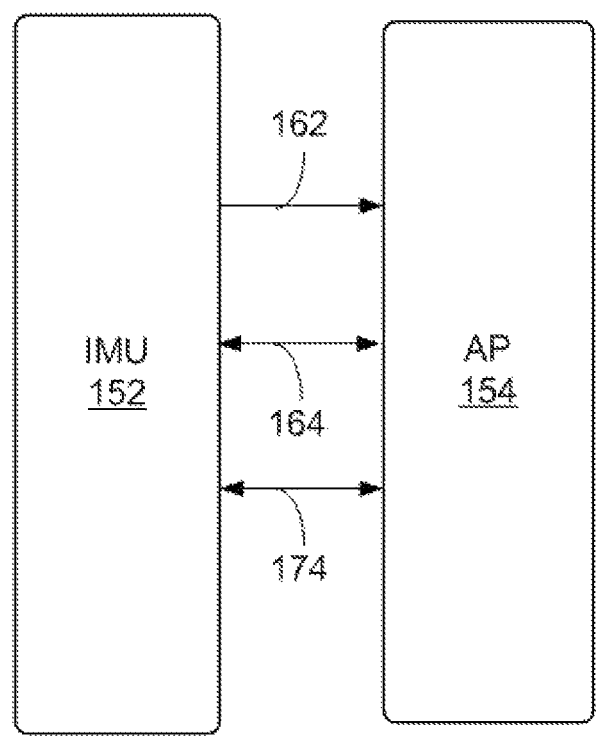
FIG. 4 is a schematic diagram of an alternative architecture wherein an additional line between the IMU and AP is employed to convey event detection information.

In order to allow the AP 154 to track both predictable and unpredictable events without permanently increasing the update rate, an event detection technique implements a buffer at the IMU 152 for use in combination with event detection technique. In this embodiment of the invention, the event detection occurs at the IMU 152. The detection of events may be based on changes in energy, sudden stops, sudden movements or accelerations, and so on. Upon detection of an event, the data sent by the IMU 152 to the AP 154 contains an indication that an event requiring a greater update rate has occurred. In an alternative embodiment of the invention, an additional line 174 between the IMU 152 and AP 154 is employed to convey event detection information as shown in FIG. 4.

As a result the AP 154 is apprised that the IMU 152 has identified an event by its own heuristics. The indication from the IMU 152 regarding event detection need not be robust, i.e., false-positives may temporarily increase bandwidth usage but otherwise are not harmful since the AP 154 will still perform a detailed analysis of the data generated by the IMU 152 during the event.

Because a detailed analysis of event data by the AP 154 will generally require analysis of intermediate data points, the IMU buffers these points in an embodiment of the invention. In a first embodiment of the invention the AP 154 is responsible for requesting the intermediate points if needed, whereas in a second embodiment of the invention the IMU 152 automatically send the intermediate points once it has detected an event. While either option is suitable, the first option may be preferred because the control of updating remains at the AP 154.

Figure 5:
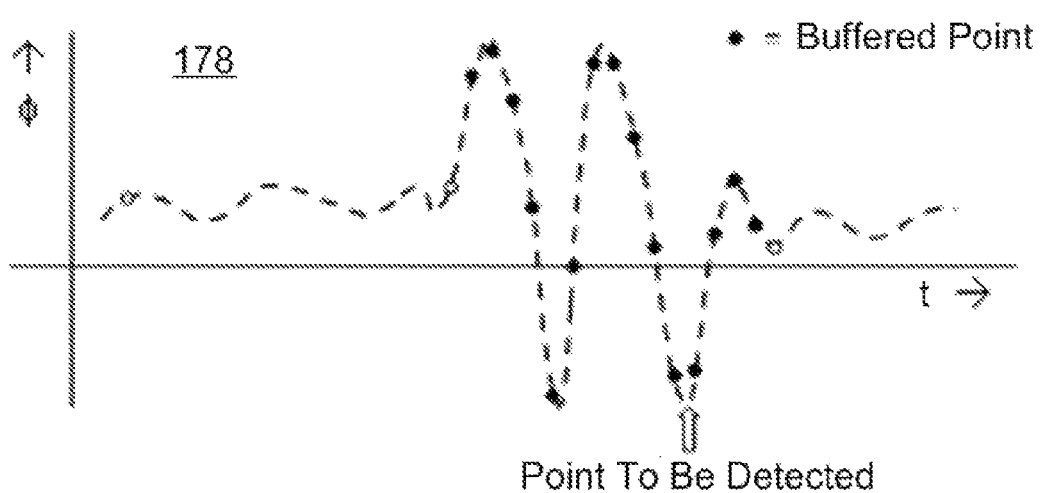
FIG. 5 is an example data curve showing buffering of all intermediate points between two consecutive AP data-requests.

In either case, the IMU 152 maintains the intermediate points in a backtrack buffer. To be more precise, in order to enable the AP 154 to precisely analyze the event, the AP 154 needs the intermediate points and therefore the IMU 152 must buffer all the intermediate points between two consecutive AP data-requests. This situation is exemplified by sample curve 178 in FIG. 5. In the illustrated sample curve 178, the open points represent updates routinely requested by the AP 154, whereas the solid points represent intermediate values that have been buffered. To implement retrieval of data in the backtrack buffer, the AP 154 sets the IMU 152 in a 'flushing' mode, e.g. using for the serial communication line, after the AP 154 receives the event detection indication from the IMU 152. In an embodiment of the invention, once the interrupt line is asserted, the IMU 152 simply starts transmitting all of the buffered data-points, starting with the oldest and ending with the last one after the assertion.

Figure 6:
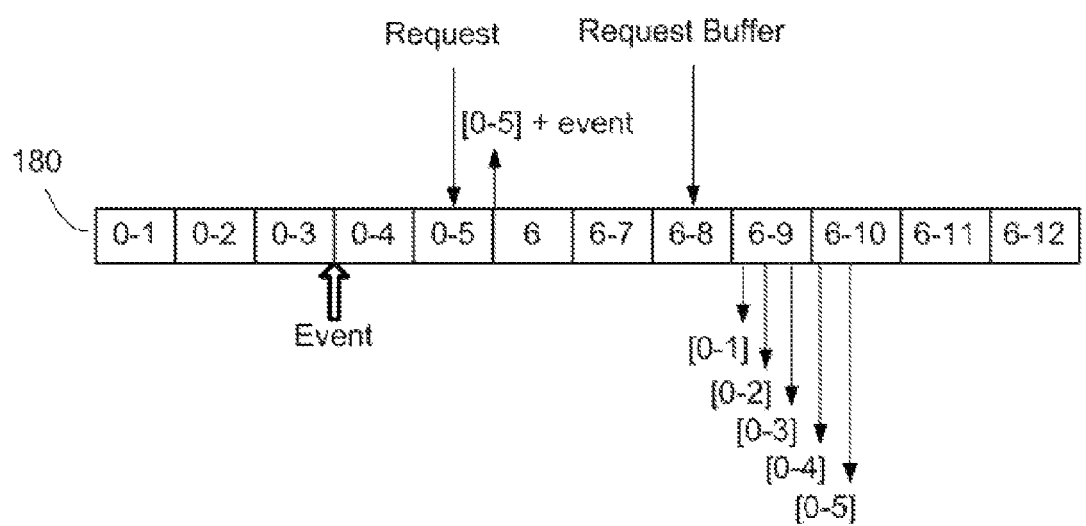
FIG. 6 is a simplified diagram of an exemplary frame stream including an event notification and buffer flush.

An exemplary frame stream including an event notification and buffer flush is shown in FIG. 6. The illustrated frame sequence 180 progresses through 12 samples, with an event being detected by the IMU 152 after the third sample. Pursuant to the next update request from the AP 154, the IMU 152 transmits the update data as well as an event notifier. In response to the event notifier, the AP 154 requests the backtrack buffer contents during the eighth sampling interval, and the buffer is flushed (including all points [0-1] through [0-5]) over the course of the next two sampling intervals. In the meantime all new data is stored in the backtrack buffer as well. In an embodiment of the invention, once a buffered element is transmitted, it is deleted from the buffer. Furthermore, it will be appreciated that with the foregoing technique, only the intermediate points between two data requests need to be buffered.

Figure 7:
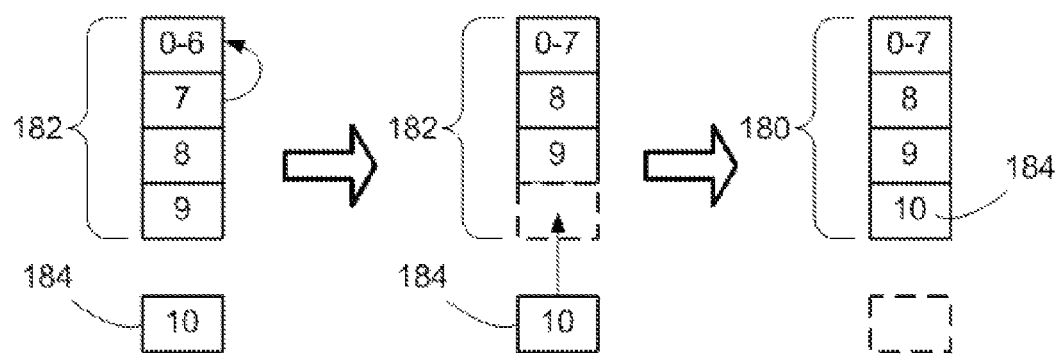
FIG. 7 is a buffer sequence diagram showing combining of the two oldest values via strap down integration in an embodiment of the invention.

In the event that the interval between two consecutive data requests from the AP 154 becomes very large, it is possible for the backtrack buffer to become completely filled and overflow. However, instead of simply deleting a sample, for example deleting the oldest value as would ordinarily be done with a FIFO structure, the IMU 152 combines the two oldest values via strap down integration (accumulation) in an embodiment of the invention. This operation is illustrated schematically in FIG. 7.

In particular, the buffer 182 is illustrated as initially containing 4 SDI data sets, with the first being a combined set of SDI values, and the last three being the latest SDI values. In addition, a new SDI value 184 (10) is to be put into the buffer 182.

To accommodate the new SDI value 184, the oldest SDI value (the combined value) is combined with the next oldest value (SDI value 7) to create a new oldest value (0-7), and the new value 184 (10) is placed in the buffer in the space freed up by the combining step. This means that the last value in the buffer 182 holds one SDI value (delta orientation and delta velocity), albeit over a longer integration time. The advantage of this approach is that, although the exact data point in the time series is lost, the information of the motion itself is not lost since that information is now contained in the last data value in the buffer 180. This combination technique can be applied numerous times as needed until the buffer 180 is emptied by the AP 154.

Thus, through the described novel architecture, and in combination with the optional enhancements as discussed above as desired, an IMU/AP system is provided that allows for minimum power usage for data communications between the IMU and AP. This may be useful in any type of device but is most beneficial in power-constrained mobile consumer devices such as smart phones and similar devices, as well as other self-contained tracking units, as may be employed to track shipments or personnel. While only certain examples of the described system and method have been set forth, alternatives and modifications will be apparent from the above description to those skilled in the art.

What is claimed is:

1. A method for use in a motion sensing device having an inertial measurement unit with a strap down integration unit, and an application processing unit, the method comprising:

sensing at least one acceleration value and at least one rotational value at the inertial measurement unit; converting the sensed acceleration value and rotational value into velocity and orientation increments by strap down integration; storing the velocity and orientation increments in a first buffer at the inertial measurement unit; and receiving an update request at the inertial measurement unit from the application processing unit over a first link and in response transmitting the contents of the first buffer from the inertial measurement unit to the application processing unit over a second link.

2. The method for use in a motion sensing device in accordance with claim 1, wherein the first buffer is a first in first out buffer.

3. The method for use in a motion sensing device in accordance with claim 1, wherein the update request from the application processing unit is an interrupt signal.

4. The method for use in a motion sensing device in accordance with claim 1, wherein the update request from the application processing unit is line clear signal.

5. The method for use in a motion sensing device in accordance with claim 1, further comprising: detecting a high-frequency event at the inertial measurement unit; and in response to detecting a high-frequency event, and prior to receipt of the update request at the inertial measurement unit from the application processing unit over the first link, transmitting an event notification from the inertial measurement unit to the application processing unit over a third link between the inertial measurement unit and the application processing unit.

6. The method for use in a motion sensing device in accordance with claim 5, wherein the inertial measurement unit further includes a second buffer, the method further comprising:

storing event data in the second buffer; and sending the stored event data in the second buffer to the application processing unit after an event is detected.

7. The method for use in a motion sensing device in accordance with claim 1, wherein storing the velocity and orientation increments in a first buffer at the inertial measurement unit comprises combining the two oldest values in the first buffer so as to maintain the overall motion represented by the combined data to avoid buffer overflow.

8. A motion sensing system comprising: an inertial measurement unit having a strap down integration unit, the inertial measurement unit being configured to sense at least one acceleration value and at least one rotational value, convert the sensed acceleration value and rotational value into velocity and orientation increments by strap down integration and store the velocity and orientation increments in a first buffer at the inertial measurement unit to await an update request; an application processing unit linked to the inertial measurement unit via a serial data link and an update link, the application processing unit being configured to send an update request to the inertial measurement unit via the update link and in response to receive the contents of the first buffer from the inertial measurement unit via the serial data link.

9. The motion sensing system according to claim 8, wherein the first buffer is a first in first out buffer.

10. The motion sensing system according to claim 8, wherein the update request from the application processing unit is an interrupt signal.

11. The motion sensing system according to claim 8, wherein the update request from the application processing unit is line clear signal.

12. The motion sensing system according to claim 8, further comprising an event notification link between the inertial measurement unit and the application processor, and wherein the inertial measurement unit is further configured to detect a high-frequency event prior to receipt of the update request and, in response, to transmit an event notification from the inertial measurement unit to the application processing unit over the event notification link.

13. The motion sensing system according to claim 12, wherein the inertial measurement unit further includes a second buffer and is configured to store event data in the second buffer and send the stored event data in the second buffer to the application processing unit after an event is detected.

14. The motion sensing system according to claim 8, wherein the inertial measurement unit is further configured to combine the two oldest values in the first buffer so as to maintain the overall motion represented by the combined data to avoid buffer overflow while storing the velocity and orientation increments in the first buffer.

* * * * *